(12) United States Patent
Lombardi (10) Patent No.: US 11,591,046 B2
(45) Date of Patent: Feb. 28, 2023

(54) SAFELY DEVICE FOR PASSAGE OF PIPES ON BOATS

(71) Applicants: Barbara Spita, Santo Stefano di Magra (IT); Luciano Lombardi, Bolano (IT)

(72) Inventor: Luciano Lombardi, Bolano (IT)

( * ) Notice: Subject to any disclaimer, the term of this patent is extended or adjusted under 35 U.S.C. 154(b) by 221 days.

(21) Appl. No.: 16/650,039

(22) PCT Filed: Sep. 26, 2018

(86) PCT No.: PCT/IB2018/057433
§ 371 (c)(1),
(2) Date: Mar. 24, 2020

(87) PCT Pub. No.: WO2019/064191
PCT Pub. Date: Apr. 4, 2019

(65) Prior Publication Data
US 2020/0290706 A1    Sep. 17, 2020

(30) Foreign Application Priority Data

Sep. 26, 2017  (IT) .......................... 102017000107809
Jul. 27, 2018   (IT) .......................... 102018000007599

(51) Int. Cl.
*B63B 19/26*   (2006.01)
*F16L 5/04*    (2006.01)
(Continued)

(52) U.S. Cl.
CPC ............... *B63B 19/26* (2013.01); *F16L 5/04* (2013.01); *F16L 5/08* (2013.01); *F16L 5/10* (2013.01)

(58) Field of Classification Search
CPC ....... F16L 5/10; F16L 5/08; F16L 5/04; B63B 19/26
See application file for complete search history.

(56) References Cited

U.S. PATENT DOCUMENTS 1,851,940 A  *  3/1932  Williams ............... F16L 5/08
                                                        174/152 G
3,647,230 A  *  3/1972  Smedley ............ F16J 15/3228
                                                           277/335
(Continued)

FOREIGN PATENT DOCUMENTS

EP          0964196 A1     12/1999
EP          1164677 A1     12/2001
(Continued)

OTHER PUBLICATIONS

A.B.A. Yacht S.R.L.: "Passaggi tagliafuoco A60", May 31, 2016 (May 31, 2016), XP055532415, Retrieved from the Internet: URL: https://web.archive.org/web/2016053109 3438/http://abayachtsrl.com:80/it/made-naba/passaggi-tagliafuoco-a60 [retrieved on Dec. 10, 2018] figures.

(Continued)

*Primary Examiner* — Eugene G Byrd
(74) *Attorney, Agent, or Firm* — Rumit Ranjit Kanakia (57) ABSTRACT

The present invention concerns in particular the nautical equipment sector, with particular reference to the installation of pipes on board of boats of any size and kind. In particular, the present invention deals with safety devices for routing pipes between different sectors of the hull, passing through the bulkheads separating the various vans/spaces/housings of a boat. More specifically, the present invention describes a device (1) for the passage of pipes (5) for liquids or gases through bulkheads and decks of yachts, mega yachts and naval vessels in general with fireproof characteristics preferably and in a particularly innovative way, even watertight/tight.

7 Claims, 5 Drawing Sheets

(51) Int. Cl.
*F16L 5/08* (2006.01)
*F16L 5/10* (2006.01)

(56) References Cited

U.S. PATENT DOCUMENTS

| | | | | | |
|---|---|---|---|---|---|
| 3,649,034 | A | * | 3/1972 | Barton | H02G 3/22 277/606 |
| 3,655,907 | A | * | 4/1972 | Philibert | H02G 15/013 174/358 |
| 4,406,484 | A | * | 9/1983 | Ramer | F16L 5/08 52/21 |
| 4,699,405 | A | * | 10/1987 | Miller | F16L 21/007 285/341 |
| 4,717,160 | A | * | 1/1988 | Zitting | F16J 15/184 277/584 |
| 4,936,064 | A | * | 6/1990 | Gibb | F16L 5/04 428/921 |
| 5,267,759 | A | * | 12/1993 | Prokop | H01S 3/03 285/353 |
| 5,458,343 | A | * | 10/1995 | Dornfeld | F16L 5/08 277/606 |
| 5,697,194 | A | * | 12/1997 | Gignac | G02B 6/4471 52/220.8 |
| 6,059,323 | A | * | 5/2000 | Ekholm | F16L 27/125 285/302 |
| 6,862,852 | B1 | * | 3/2005 | Beele | F16L 5/04 52/220.8 |
| 2010/0219589 | A1 | * | 9/2010 | Kesson | F16L 5/08 277/606 |
| 2011/0018210 | A1 | * | 1/2011 | Beele | F16L 5/10 277/606 |
| 2021/0291935 | A1 | * | 9/2021 | Michaeli | B63B 3/08 |

FOREIGN PATENT DOCUMENTS

| | | | | |
|---|---|---|---|---|
| EP | 1519092 | A1 | * 3/2005 | F16L 5/04 |
| JP | 2011052448 | A | * 3/2011 | |
| JP | 2014148998 | A | * 8/2014 | |
| JP | 2016128718 | A | * 7/2016 | |
| JP | 2016194369 | A | * 11/2016 | |

OTHER PUBLICATIONS

A.B.A. Yacht S.R.L.: "A.B.A. Yacht s.r.l.", Jul. 12, 2017 (Jul. 12, 2017), XP055533173, Retrieved from the Internet URL:https://web.archive.org/web/20170712073325/http:/abayachtsrl.com/it [retrieved on Dec. 12, 2018] figures.

A.B.A. Yacht S.R.L.: "Passaggi stagni tagliafuoco A60", Oct. 24, 2017 (Oct. 24, 2017), XP055532420, Retrieved from the Internet:URL:https://web.archive.org/web/20171024202547/http://www.abayachtsrl.com/it/made-in-aba/passaggi-stagni-tagliafuoco-a60[retrieved on Dec. 10, 2018] figures.

* cited by examiner

SAFELY DEVICE FOR PASSAGE OF PIPES ON BOATS

The present invention concerns in particular the field of nautical installations, with particular reference to the installation on board of boats of pipes of all sizes and kinds.

In particular, the present invention deals with devices for routing pipes on deck and bulkheads separating the various vanes/spaces/housings of a boat.

Even more in particular, this invention describes a device for the passage of pipes for liquids or gases through bulkheads and decks of yachts, mega yachts and naval units in general with fireproof characteristics (corresponding at least to international standards, such as A60).

It should be noted in particular that the present patent application supplements the content of the patent application Ser. No. 10/20170007809 filed by the same applicant on 26, Sep. 2017 and which describes the same invention, in particular the applicant considers it necessary to better define the technical aspects of the invention with reference to the purposes and advantages and forms of realization of the invention, without adding anything in terms of novelty compared to the cited application, but only desiring to better describe the innovative contents, so the present patent application will be filed claiming the internal priority of the above application.

PRIOR ART

The current state of the art is represented, as is well known by experts in the field, by passages for deck and bulkhead pipes characterized by sets of flanges and semi-flanges incorporated in flame retardant cushions, usually welded directly onto the through pipes and/or on specially drilled and prepared walls or decks of naval units. This installation is disadvantaged by very invasive interventions on existing systems. Still, in a further disadvantageous way, in the case of already launched naval units, such devices/systems for the passage of pipes or similar are difficult to install due to their size, except by making significant structural changes with consequent significant costs, as well as inconveniences from the organizational point of view that may occur on board naval units of significant size that can lead to encumbrances of space for other purposes.

Basically, the main criticalities of the current deck and bulkhead passages derive from several factors including: excessive overall dimensions of these passages which, where necessary, do not allow, on already launched vessels, deviations of the pipes passing through secondary areas of lounges, chambers, etc. of yachts, mega yachts and naval units in general.

In the case of naval units still to be launched (new), however, the spaces and overall dimensions are such as to make the interventions particularly costly both in economic terms and in operational terms.

With particular reference to pleasure boats: the work areas are reduced to a minimum in order to offer more space to saloons, rooms and quarters in general. The current state of technology, on the other hand, requires considerable space and encumbrance for the installation of piping passages, which makes them difficult to reconcile with the above requirements. There is also considerable difficulty in fitting such installations on board, when these passages are too cumbersome compared to the available space (which is the case in most circumstances).

A further problem is the difficulty of lateral pipe deflection.

In a further disadvantageous way, a further negative aspect derives from the reduction of the intrinsic resistance characteristics of the walls through which such passages pass and/or from the reduction of the resistance/solidity of the same pipes due to the need of the current systems/devices to perform welding to fix the passages directly on the walls and/or pipes, obviously reducing the resistance characteristics of both structures and/or pipes, with consequent fatigue of the structures and/or pipes themselves, to the disadvantage of the life/wear time.

The current state of the art therefore does not offer to the customers solutions that are lean, non-invasive, non onerous, do not affect the technical characteristics of the piping and/or walls/decks of yachts, mega yachts and vessels in general in which these passages are mounted.

Furthermore, it should be noted that to date these passages have been certified at most as fireproof, given the impossibility, due to their intrinsic construction characteristics, of providing guarantees and certifications regarding the contemporaneity of further aspects, such as, for example, watertightness. It is obviously considered that, at the level of the top side of the boat, these passages are at least waterproof, but as soon as they fall below the level of zero head, there are no watertight characteristics. It is clear that this is particularly disadvantageous given the obvious need to be able to isolate one or more compartments as necessary in the event of flooding on board.

Among the purposes of the present invention is the solution of the above mentioned known art problems.

It is therefore a purpose of the present invention to describe a device for the passage of pipes for deck and bulkheads for boats, which guarantees certifiable characteristics both fireproof and waterproof (watertight).

Again, it is a purpose of this invention to describe a deck and bulkhead pipe passage device that is simple and possible to mount on any type of boat both during production and post-production of the boat.

A further purpose of this invention is to describe a space-saving deck and bulkhead pipe passage device.

Again, it is a purpose of this invention to describe a deck and bulkhead pipe passage device that eliminates the problem of structure fatigue.

Finally, it is a purpose of this invention to describe a deck and bulkhead pipe passage device that allows to optimize the costs and installation times both before and after production.

BRIEF DESCRIPTION OF THE INVENTION

These and other purposes will be achieved by virtue of the innovative device for the passage of deck pipes and bulkheads that is object of this invention that advantageously ensures, guarantees and certifies at the same time the resistance and the maintenance of the characteristics of fireproof and/or waterproof (watertight) at least to 10 meters of waterline eliminating, at the same time, all the disadvantages and criticalities related to the current state of the art.

Said safety device for the passage of deck and bulkhead pipes includes at least a static sealing device comprising at least a double flange suitable for being fixed in a sleeve/passage of any diameter suitable for the passage of boat pipes, said double flange comprising at least two cylindrical-shaped flange sides, which can be coupled together, said device being advantageously characterized by the fact that said flange sides are in turn divided into at least two or more further semi-flanges each in the form of a cylindrical sector, said semi-flanges being of at least two types and including coupling areas to be coupled facing each other to form said first flange side and coupling areas to be coupled and form said second flange side said flanges being coupled facing each other to form a double flange, the device being modular and including any number of semi-flanges being assembled directly on board of a boat in boat deck and/or bulkheads sleeves/tube passages of any type, being adaptable also to pre-existing passages.

Again, in a particularly advantageous way, between said at least one first and said at least a second flange and between the coupling zones of semi-flanges of a first type there is at least one gasket/packing.

In a further advantageous way such at least one gasket, included in the device and housed there as will be described below, being for example preferably made of graphite, makes the device both fireproof and watertight. The gasket thus defined may comprise a number of gasket sections to form an assembly, such an assembly of gasket sections or parts being properly assembled with each other and with the device.

The advantage of both fireproof and waterproof characteristics has already been certified in the test phase, meeting the standards required in the sector and being certified up to 10 meters of waterline.

In particular, such a gasket(s) or an assembly of parts/sections of gasket(s) is (are) placed between such at least a first and said at least a second flange, both following the outer circumference of the flange and the inner one, moreover said gasket is also further placed in the areas of coupling between the various semi-flanges, this will be described more clearly with reference to the figures attached below. In particular, the coupling of the at least two flanges (consisting of two or more semi-flanges) compresses said gaskets both towards the outside and towards the inside of the passage itself (the passage remaining between the outer circumference of the device and the hole physically made in the deck/bulkhead).

This compression occurs by virtue of the shape of the flanges/semi-flanges themselves, which are of at least two types: a first flange and the relative semi-flanges are made with an internal and external circumference in the form of a cylindrical crown, with edges or external profiles raised with respect to the plane of the first type semi-flange; these profiles in particular may have preferably a cuneiform section; a second flange and any relative semi-flanges, on the other hand, are made with an internal and external circumference in the form of a cylindrical crown with edges or external profiles lowered with respect to the plane of the flange or relative semi-flanges constituting the said flange, which faces the relative further semi-flange or flange suitable for coupling with it.

For the first type of semi-flanges, which can be defined as "male", these semi-flanges include at least one abutting element, for example of cuneiform shape. This abutting element develops radially from the external radius to the internal radius of the semi-flanges of the "male" type, there is a number of abutting elements of choice in each semi-flange male.

In particular, such male semi-flanges include external semi-crowns with radius $r1$, of any thickness, the profile of said external male semi-crowns is preferably abutting of preferably of cuneiform shape, the same is true for the internal semi-crowns of said first male semi-flange, of radius $r2$, with any thickness.

Second type semi-flanges, which will be defined as "female" in the areas of coupling with each other, include depressions which, when coupled, form areas of housing for at least one part of the gasket or packing. These zones develop substantially radially from the outer radius $r1$ to the inner radius $r2$ of the female semi-flange. These coupling zones, suitable to house at least part of said gasket assembly, during the assembly phase will be placed in correspondence with the abutting elements of the male semi-flanges, in this way this element advantageously compresses this part of the gasket towards the sides and the bottom of the housing formed by the coupling zones of the female semi-flanges.

Furthermore, said female semi-flanges Sfout include external semi-crowns with radius $r1$ of any thickness provided compatible with the thickness of the male semi-flanges, and identically internal semi-crowns of radius $r2$ having the same characteristics.

The internal profile $r2$ of said female external semi-crowns preferably includes a depression that develops along the semi-circular crown, this depression or overhang, forming a housing Sfint is suitable to accommodate an additional portion of the gasket or set of gaskets mentioned above.

Identically, this also applies to the internal semi-female crowns of radius $r2$, which include an overhang or depression suitable for housing an additional gasket or portion of gasket.

Advantageously, during the assembly phase (which will be described in detail in the attached figures), the housings Sf of the female semi-flanges including said gasket portions are coupled with the corresponding internal and external profiles Smint and Smout of the male semi-flanges; in a particularly advantageous way, the profiles Sm are suitable for compressing the relative gaskets towards the interior of the housing Sf, or rather close to the jutting or better said, of the shoulder of the female semi-flange and also towards the exterior of the housing: During assembly, therefore, on the external side, the portion of the external gasket that develops on the circular profile of radius $r1$ is compressed onto the sleeve/tube liner that is inserted into the wall of the deck/bulkhead in which the device is housed. Instead, the gasket housed in the internal housing is compressed towards the interior of the housing close to the female semi-flange on one side and close to the tube passing through on the other. While the gasket present in the radial housings of the female semi-flanges is compressed by the radial element of the male semi-flanges, compressing it against the two shoulders of the female semi-flanges and against the bottom of the housing: it should be noted that in this way, the same sealing characteristics are guaranteed in an innovative way between the sleeve/flange and the deck/flange between the male semi-flange and the female semi-flange in the areas corresponding to the circumferences, parts of the circumferences and relative housings, radii $r1$ and $r2$.

The aforementioned sealing systems, housed within the structure of the passage, ensure that in the event of fire and/or flooding, the fireproof and waterproof (watertight) characteristics are respected within 10 meters of waterline.

To support the compression system of the gaskets indicated above, a special thermo-expanding tape is housed in the entire perimeter of the passage which, in the event of fire, has the capacity to increase its volume up to 16 times its original size.

It is immediately evident that in a particularly advantageous way such a device, by compressing the gasket assembly (or packing as it is defined in the sector) as described, provides a complete seal both fireproof and advantageously also watertight to the safety device once it has been installed.

Therefore, the device or organ with at least a double flange, suitably shaped through, for example, the turning process, is assembled in such a way as to compress both towards the outside and towards the inside of the passage itself the aforementioned gaskets housed during the assembly phase within its structure, guaranteeing, in the event of fire and/or flooding, the characteristics of the A60 fire stop (direct flames at 1000 degrees Celsius for 60 minutes) and water resistance (watertight) up to 10 meters under the waterline.

The passages also allow a limited axial movement of the pipe relative to the deck or bulkhead concerned, so as to absorb any expansion or vibration without this affecting the fire and water resistance characteristics described above.

Still in a further advantageous and innovative way it is clear that, given the modular nature of this device, it is much easier to mount it on any type of boat, both during construction and in a boat already launched.

In a further advantageous way, the transport and maintenance of this device is also extremely simplified, the device therefore allows high practicality for subsequent disassembly and reassembly where maintenance needs should become necessary, resulting in considerable savings in time and money for the owner and/or manufacturer. The device which is the subject of this invention shall also ensure continuity to the deck or bulkhead which is being worked on without the need for additional space.

This is immediately evident to any expert in the field, and is also related to obtaining the fireproof and waterproof characteristics, so that in a particularly inventive way the present invention with the same embodiment brilliantly solves two important technical problems of the sector.

BRIEF DESCRIPTION OF THE FIGURES

These and further advantages obtained by virtue of the innovative safety device for pipes described by the present invention will be clarified with particular reference to the description of some particularly preferred forms of realization described in the attached figures in which.

DETAILED DESCRIPTION OF THE FIGURES

It is understood that the attached figures are intended merely as an indication of a particularly preferred form of embodiment of the present invention and in no way limit the present invention to any further possible variant of realization.

Figures 1A, 1B, 1C:
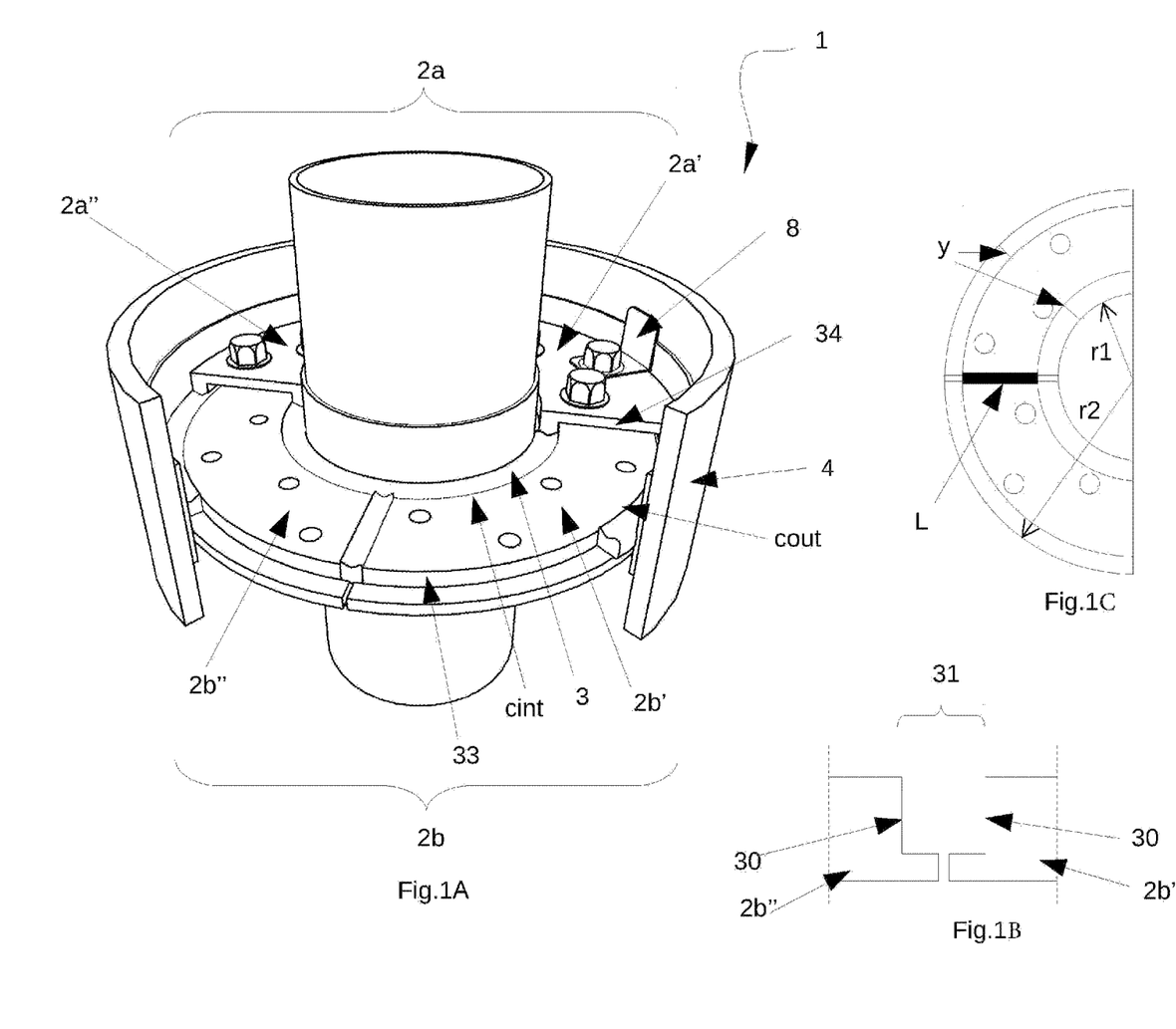
FIG. 1A shows a simplified overview of the safety device partially assembled in a sleeve/tube.
FIG. 1B shows a simplified view of a section of the device.
FIG. 1C shows a simplified top view of a semi-flange.

With reference to FIG. 1A, there is represented a particularly preferred form of realization of the safety device 1 for naval pipelines, also called double flange device, described by the present invention, in particular device 1 includes at least a pair of flanges 2a, 2b, for which the device will be defined as double flange, these flanges are suitable to couple with each other, as it will be described below. The mechanical safety device 1 with at least double flange 2A, 2B, can be divided into several sectors, or semi-flanges, suitably shaped through the process of turning and milling.

Such flanges 2A,2B are preferably defined as at least one male flange 2A and at least one female flange 2B and include at least any number of semi-flanges 2a', 2a", 2b',2b" etc. each of which is a male flange 2a', 2a" etc., being suitable for coupling to one or more of its female semi-flanges 2b', 2b" etc.

Figure 2:
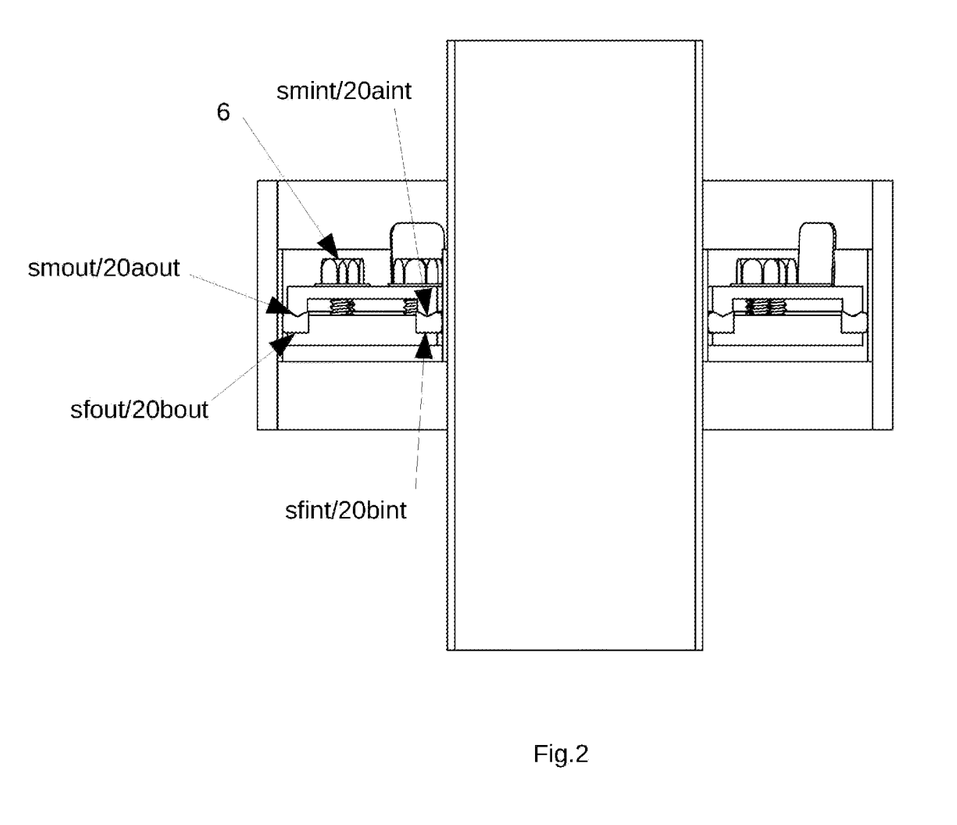
FIG. 2 shows a view of a section of the assembled safety device.

These semi-flanges 2a', 2b' are made with circumference Cint, Cout internal and external in the shape of a circular crown: in particular with edges or external and internal profiles 20aint and 20aout of radius respectively r2 and r1 (better visible in FIG. 2) that are raised with respect to the plane of the semi-flange of first type 2an (in particular to the plane that faces to couple with the semi-flange of second type 2bn), these profiles can have preferably wedge-shaped section 20a. At least one flange 2b of second type and its semi-flanges, if any, 2b',2b" etc. instead are made with internal and external circumference of circular crown shape Cint, Cout with external edges or profiles and internal 20bint and 20bout of radius respectively r2 and r1 made embossed and lowered (with a hollow or excavation) 20b compared to the rest of the plane of flange 2B (in particular to the plane that faces to couple to the flange of first type 2an and/or its semi-flange 2an constituting said flange. (Each of these flanges and semi-flanges being therefore a cylinder or a section of cylinder).

This shoulder, which is hereafter also referred to independently as an overhang or depression 20b each forming a suitable enclosure to accommodate a portion of a gasket 3 or gasket assembly 3.

During the assembly phase, namely the coupling of male semi-flanges 2a', 2a" and female semi-flanges 2b', 2b" that will be coupled facing each other—the housings 33 formed by the depressions 20bint and 20bout of the female semi-flanges 2b'—that have a thickness Y and length of the outer circumference Cout—are coupled with the corresponding internal and external profiles 20aint and 20aout of the male semi-flanges 2a'; in a particularly advantageous way profiles 20a are suitable for compressing the corresponding gaskets 3 in housing 33, i.e. compressing them close to the overhang 20b of the female semi-flange, towards the bottom, and also towards the outside of housing 33, or against the through pipe 5 respectively in the case of the gasket housed in 33/bint and the sleeve/tube housing 4 in the case of compression of the gasket housed in housing 33/20bout.

Figure 4:
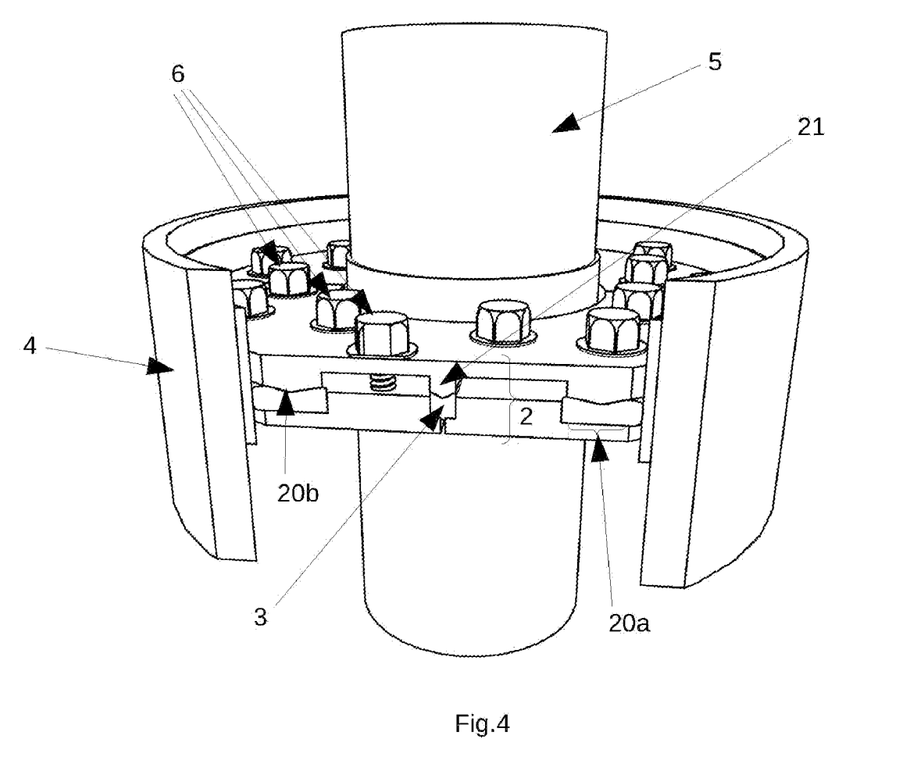

Again, with reference to FIG. 1A and FIG. 4 in particular, the semi-flanges 2'an of the first type, include at least further abutting radial elements 21, for example of wedge-shaped type 21—which will be defined below as element 21 of length L=((r1 external radius−r2 internal radius)−Y (embossing or depression thickness)×2) and width X of any kind according to the construction requirements. This abutting element 21 develops radially from the external radius r1 to the internal radius r2 of the semi-flanges of type "male" 2'a, and there is any number of elements 21 in each semi-flange 2a',2a",2an according to the number of semi-male flanges 2an (and relative female semi-flanges 2'bn).

No special machining is required in the coupling areas 34 between male flanges.

The semi-flanges 2bn (FIG. 1B) on the other hand in the coupling zones one with the other include depressions that coupled together form housing zones 31 for at least a part of gasket 3 or a gasket 3. These zones develop radially from the outer radius r1 to the inner radius r2 of the female semi-flange and have length L substantially equal to the length of element 21. Said housing zones 31, suitable to house at least part of said gasket assembly 3, during assembly with the male semi-flanges, will be placed in correspondence with the abutting elements 21 of the male semi-flanges 2A, in this way such element or profile 21 advantageously compresses the gaskets 3 housed therein towards the bottom and the sides of the housing 31 formed by the coupling of the lowered coupling zones of the female semi-flanges 2b'.

As previously mentioned, this guarantees the innovative fire and waterproof features, also for the innovative modular device 1 described here also in the radial coupling zones of the semi-flanges, one with the other.

In a first phase of assembly between flanges of the same type, therefore, the coupling zones of the female flanges 2bn form housings 31, suitable to house a gasket part 3. In a second step, the male semi-flanges are placed with zones 21 facing said housing 31, so that these abutting elements compress the gaskets 3 in the housings 31.

Figure 3:
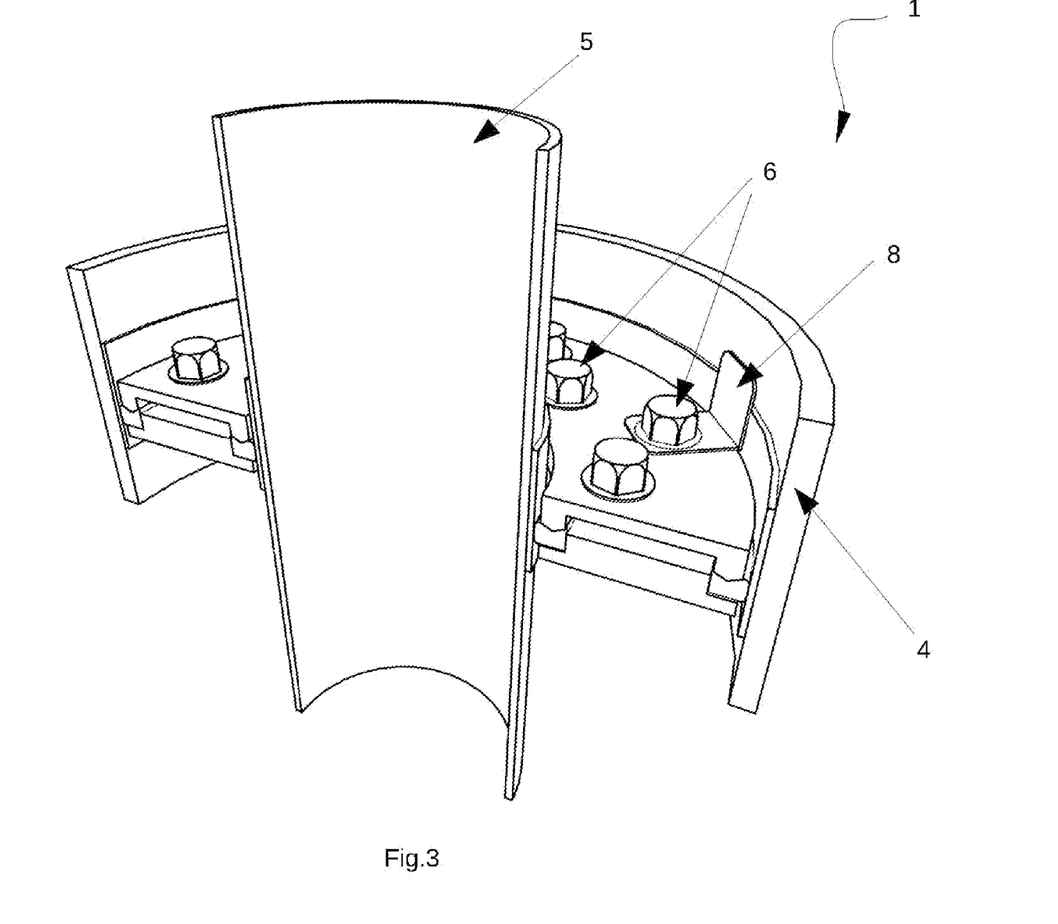
FIGS. 3 and 4 show further perspective views of different sections of a particularly preferred form of construction of the safety device described in the present invention.

During assembly, therefore, on the external side of the circumference Cout, with flange 2bn assembled, —see FIG. 3 where this zone is better visible) the portion of the external gasket 3 is housed along all the circular profile of radius r1 and, once the flange 2an has been coupled, this gasket 3 is compressed on one side onto the sleeve/tube liner 4 that is inserted into the wall of the deck/bulkhead (not represented here) in which device 1 is housed. On the other hand, the gasket 3, which is housed in the internal housing of the flange 2bn, of circumference Cint—(i.e. the one made by the coupling of semi-flanges 2bn, which form a closed flange 2B) that will be defined as housing 32—is compressed, once the male flange 2an has been coupled, on one hand towards the inside of housing 32 and on the other hand close to the side walls of housing Sfin/32, so that towards the flange 2B itself on one side and on the other, if there is no flange 2B, it is compressed close to the through pipe 5 which is housed in device 1.

Obviously, for the fixing, said device 1 shall include at least bolts or means suitable for purpose 6 for fixing the semi-flanges 2'a and 2'b together and further shall include at least retainers 8 and/or hooks 8 for fixing the sleeve/tube liner 4 with at least one of the semi-flanges 2a or 2b to assembled device 1.

This device therefore acts in a very advantageous way as a device for compressing of the gaskets 3 in all directions, i.e. compressing and thus conferring a watertight seal between device 1 and sleeve 4 and also between device 1 and the through tube, as well as in the areas of junction between the various elements or flanges and semi-flanges of device 1, making this device 1 assembled with its sleeve/tube liner and through tube, totally watertight and fireproof as certified at least up to two meters (as above).

To support the tightness of this device 1 it can further include and accommodate in the entire perimeter/circumference r2 of the passage, or wrapped on the passing pipe, and also outside in the perimeter/circumference r1, or close to the sleeve, a special material such as a thermo-expanding tape that, in case of fire has the ability to increase its volume up to at least sixteen times its original size.

The deck and bulkhead passage device object of the present application also has the additional characteristic of being a self-supporting system. The passages thus constructed once fixed through the closure of the bolts on the semi-flanges are able, through the sole force of compression of the seal fixed there, to block the entire structure of the passage to the wall or deck without any further need for installation of other anchoring systems. Therefore, this device is a self-supporting device by means of the compressive force between the device and the sleeve/tube.

For the sake of structural safety and stability over time, welded retainers are inserted on the sleeve to prevent that, in the event of flooding, the pressure of the water exerted on the passage system, involves the movement and therefore the frustration of its specific characteristics.

In a further advantageous way, device 1 characterized by a modular system of semi-flanges surrounded by seal/gasket 3 preferably in graphite, allows a limited axial movement of the pipe in relation to the deck or bulkhead affected by the passage itself so as to absorb any expansion or vibration without this affecting the fire and waterproofing characteristics described above.

The combined characteristics of fireproof and waterproof (watertight) with 10 meters of waterline allow to respond fully to what is the evolution of the law and the increasingly stringent safety standards require solutions to ensure characteristics of fireproof and waterproof (watertight), to allow yachts, mega yachts and vessels in general the navigational clearance issued by the certification bodies authorized to issue such permits.

Note that the type of certification does not limit the scope of the present invention, such certifications are cited as a mere example since they are those normally required in this field, in any case different types of certifications not relevant to the scope of protection of the present invention.

Figure 5:
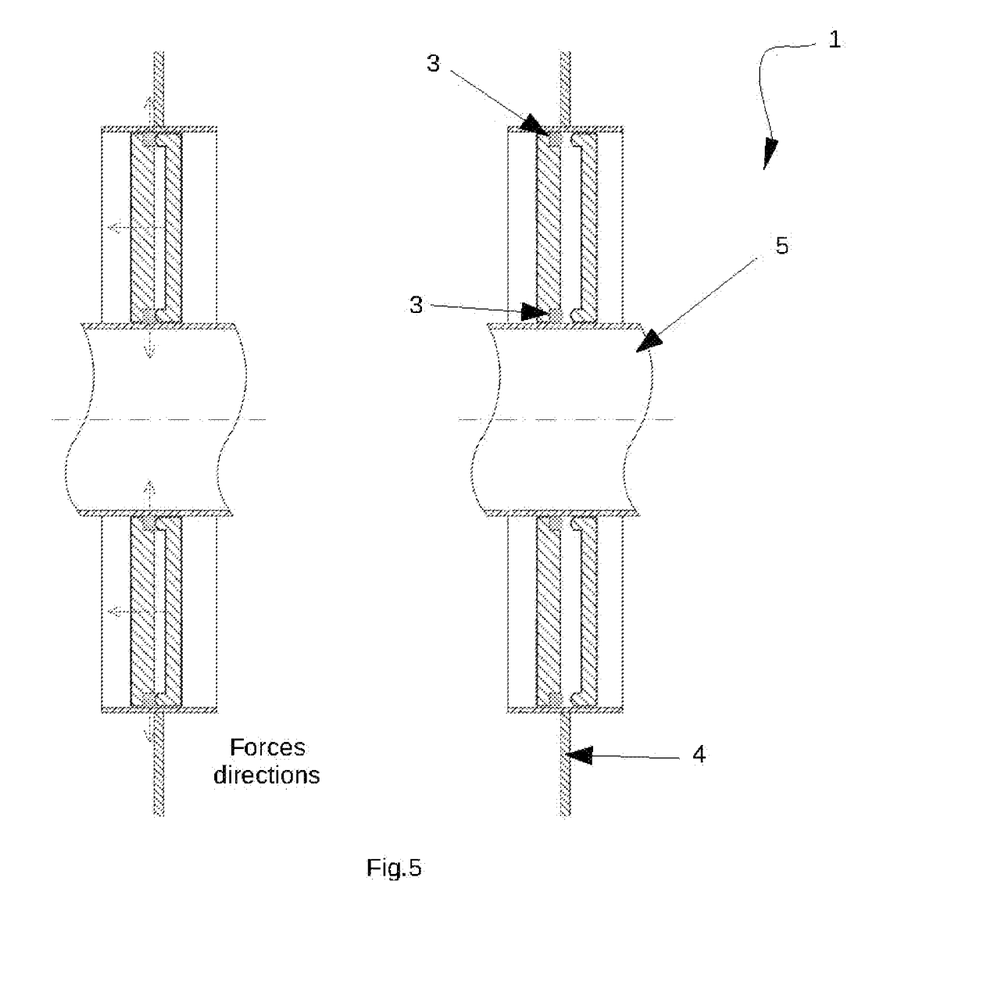
FIG. 5 shows the force directions of an innovative device element.

The device 1 is advantageously sealed with said gaskets 3 or packing (term of the sector) preferably in graphite and at least gaskets 3 for example preferably in a thermo-expanding material; in case of fire these gaskets turn into a foam with high insulating power with a thickness up to 16 times the initial thickness For this purpose, the stress directions of the gasket or packing 3 are visible in FIG. 5.

It should be noted that have been herein always mentioned gasket 3 or gasket assembly 3, it goes without saying that there will be gaskets with a shape and contour suitable for each housing defined in this gasket, all having the same purpose and function for simplicity any element or part formed by the gasket/packing 3 assembly is defined as gasket 3.

The passages generally allow the lateral deflection of the pipes and the crossing of decks and/or bulkheads of yachts, mega yachts and naval units in general for the carbon steel pipes for the transport of liquids or gases, with internal pressure equal to or different from the atmospheric pressure, with internal temperature equal to or different from the environmental temperature, by virtue of this invention are guaranteed at the same time the maintenance of the characteristics of A60 fireproof and waterproof (watertight) up to 10 meters of waterline of decks or naval bulkheads crossed.

The passages also allow to make the structure of the deck and/or the bulkhead crossed by these types of pipes continuous eliminating any breaking points in case of accidents.

It should be emphasized that the evolution of regulations and increasingly stringent safety standards require innovative solutions for these types of work able to ensure characteristics of fireproof and waterproof (watertight), to allow yachts, mega yachts and vessels in general the navigational clearance issued by the certification bodies authorized to issue such authorizations. The invention presented here not only ensures in a particularly advantageous and innovative way the contemporaneity of these solutions, i.e. fireproof A60 and waterproof (watertight), in particular, in an advantageous way up to 10 meters of waterline, decks or ship bulkheads crossed, it also ensures the following advantages:

considerably reduced dimensional characteristics capable of resolving the criticalities of the current state of the art described above;

ease of assembly as the innovative devices are preferably built in semi-flanges, so they can be assembled both in the workshop and directly on board the ship;

total weight of the device greatly reduced compared to the current state of the art being the same constructible in alloys of iron, aluminum, titanium, iron, etc.;

ease of assembly in even very restricted spaces, such a device being, as said, advantageously assembled from different sections of semi-flanges (composed of some or a plurality of parts, each variant being included in the subject of the present invention);

possibility of assembly in yachts, mega yachts and naval vessels of any kind, both new and already launched, in which other types of systems for the operation of the vessels themselves persist without their having to be dismantled. removed/moved to other, sometimes non-existent, locations, so that the device can be installed without disassembling existing equipment;

maintaining the full solidity of the vessel by not altering either the piping or the hull, which is advantageous in terms of safety.

It should be noted in particular that in the case of large pipes, the passage device may be designed, constructed and then subdivided into a number "n" of any of the sections, without this solution affecting the characteristics proper to the invention itself or modifying its scope of protection.

It is therefore clear that this advantageous and innovative device described here is able to solve all the known art problems mentioned above and also in a further advantageous way, also guarantees watertightness characteristics never before proposed/obtained by the known art devices used for similar purposes.

Other variations in materials in which one or more parts of the safety device as described and represented in the attached figures are made, variations in which the device does not include parts which are not relevant from an innovative point of view, but which are useful only for assembly, while maintaining the advantageous characteristics explained above, the presence of one or more holes, through or blind, of any shape, the variation in size, diameter, means of fixing to the bulkheads and/or decks, packing materials, positioning in the device, positioning of the same, etc. shall be deemed to fall within the scope of protection of the present invention as better described in the attached claims.

What is claimed is:

1. A safety device (1) for passage of pipes (5) on a boat deck or bulkheads of boats, said safety device (1) being modular to be accommodated on any passage of pipes (5) on a boat deck or bulkheads of boats, and the safety device (1) comprising:

at least one static sealing member comprising at least one double flange (2) configured for being fixed in a sleeve/passage tubes (4) of a predefined diameter for the passage of pipes for the boats, said at least one double flange (2) comprising at least two cylindrical-shaped flange sides, a first flange side (2A) and a second flange side (2B), coupled to one another;

at least one gasket (3), wherein said at least two cylindrical-shaped flange side (2A, 2B) are further divided into at least two or more semi-flanges each (2a', 2a", 2an & 2b', 2b", 2bn) of cylindrical sector shape adapted to be directly coupled with the passage of pipes (5) on the boat deck or the bulkheads of boats or the sleeve/passage tubes (4), said two or more semi-flanges (2a', 2a", 2an & 2b', 2b", 2bn) comprising coupling zones (34) to be coupled to form said first flange side (2A) and coupling zones (30) to be coupled and to form said second flange side (2B), said two or more semi-flanges being coupled facing each other to form the at least one double flange (2), said semi-flanges (2an) being male semi-flanges comprising internal profiles (20aint), external profiles (20aout) and radical profiles (21) all raised above a plane of the semi-flanges (2an), and said semi-flanges (2bn) being female semi-flanges comprising internal profiles (20bint) and external profiles (20bout) and radical profiles (30) lowered compared to a plane of the semi-flanges (2bn), wherein said internal profiles (20bint), external profiles (20out) and radical profiles (30) of said semi-flanges (2bn) forming houses (31,33) to house said at least one gasket (3) of said safety device, wherein the semi-flanges (2a', 2b') comprises internal and external circumferences (Cint, Cout) in a shape of a circular crown, with external and internal edges or profiles (20aint and 20aout) of respective radius (r2 and r1) raised with respect to the plane of the semi-flange of the first flange side (2A), said profiles having preferably wedge-shaped section (20a), wherein the second flange side (2b) and the semi-flanges thereof (2b', 2b") instead comprises internal and external circumferences of circular crown shape (Cint, Cout) with external and internal edges or profiles (20bint and 20bout) of respective radius (r2 and r1) embossed and lowered with a hollow or excavation (20b) compared to the rest of the plane of the second flange side (2B) to faces to couple to the first flange side (2A) or said semi-flanges (2a', 2a") thereof to press the at least one gasket in a predefined direction in the housings (31,33).

2. The safety device (1) according to claim 1, wherein said internal profiles (20aint), external profiles (20aout) and radial profiles (21) are adapted to crush and compress said at least one gasket (3) housed in said housings (31, 33), said safety device being fire-resistant and fire-resistant up to 10 meters.

3. The safety device (1) according to claim 1, wherein the profiles (20aint, 20aout) are adapted to compress the respective at least one gaskets (3) in the housings (33), that is close to shoulders (20bint and 20bout) of the semi-flanges (2bn) and also towards the outside of the housing (33) or respectively against the pipes (5) in the case of the at least one gasket housed in the housing (33/20bint) and close to the sleeve/tube (4) in the case of the gasket housed in the housing (33/20bout).

4. The safety device (1) according to claim 2, wherein said radial profiles (21) compresses the at least one gaskets (3) housed in the housings (31) towards the bottom and the sides of the housing (31) formed by coupling of the lowered seating areas (30) of the female semi-flanges (2bn).

5. The safety device (1) according to claim 4, wherein said at least one gasket (3) is of graphite material or a material configured for making the safety device both fireproof and watertight.

6. The safety device (1) according to claim 1 further comprising: a thermo expanding agent placed, in use, placed wrapped around said tube (5) and/or adjacent to said passages/sleeve (4) is said thermo expanding agent having the capacity to increase its volume up to at least sixteen times its original encumbrance in case of fire.

7. The safety device (1) according to claim 1 further comprising pins and/or bolts (6) to fix said semi-flanges and flanges to each other, and wherein said safety device being, in use, a self-supporting device by means of compression force between the safety device and the sleeve/passage tube (4).

\* \* \* \* \*